United States Patent Office 3,272,873
Patented Sept. 13, 1966

3,272,873
HYDROGENATION OF ALPHA,BETA-
UNSATURATED ALDEHYDES
Walter James Porter, Jr., Baton Rouge, La., Rhea N.
Watts, deceased, late of St. Francisville, La., by Beulah
Smith Watts, legal representative, St. Francisville, La.,
and Leroy Virgil Robbins, Jr., Baton Rouge, La., as-
signors to Esso Research and Engineering Company,
a corporation of Delaware
No Drawing. Filed Oct. 18, 1961, Ser. No. 146,037
8 Claims. (Cl. 260—638)

The present invention relates to the hydrogenation of alpha,beta-unsaturated aldehydes. More particularly, it relates to a process wherein the olefinic double bonds of said alpha,beta-unsaturated aldehydes are saturated with hydrogen prior to final hydrogenation of the aldehydes to alcohols. Still more particularly, it relates to a process in which an alpha-beta-unsaturated dimer aldehyde product obtained by the aldolization of a monomer aldehyde having two alpha hydrogens in the presence of a cobalt soap is treated with hydrogen at elevated temperatures prior to removal of the cobalt and prior to final hydrogenation to obtain the corresponding alcohol whereby the cobalt soap is reduced to cobalt metal and the olefinic double bond of said unsaturated aldehyde is hydrogenated.

The production of alcohols by dimerization of lower molecular weight aliphatic aldehydes and catalytic hydrogenation of the dimer aldehydes is becoming an increasingly important commercial process. The resultant alcohols are of particular value in the preparation of plasticizers for polymeric resins and the like.

While various specific means may be utilized in carrying out the aldehyde dimerization, this step of the process essentially involves an aldolization reaction followed by dehydration of the aldol as may be illustrated by the following equations:

(1)
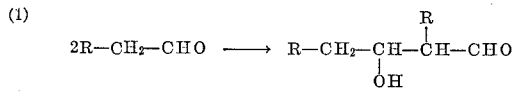

(2)
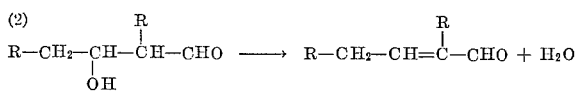

The resultant alpha,beta-unsaturated dimer aldehyde upon hydrogenation in the presence of a suitable hydrogenation catalyst provides the corresponding dimer alcohol.

The aldolization-dehydration reactions illustrated above are generally carried out in the presence of a condensation catalyst. In the past, alkaline substances, e.g. alkali or alkaline earth metal oxides or hydroxides have generally been used for this purpose. More recently, the soluble salts of certain metals, e.g. metal soaps, have been found to be especially effective aldolization-dehydration catalysts. For example, in the presence of from 0.05 to 5 wt. percent of cobalt as a salt of a $C_6$ to $C_{22}$ carboxylic acid, either alone or in combination with soluble salts of other metals, monomer aldehydes having two alpha hydrogen atoms and from 2 to 20 carbon atoms are readily aldolized and dehydrated to the corresponding alpha,beta-unsaturated dimer aldehydes under relatively mild conditions, e.g. refluxing the monomer aldehyde and removing water of reaction as it forms. In this way, yields of alpha-beta-unsaturated dimer aldehydes ranging from 50 to virtually 100% are obtained.

Mixtures of aldehydic products containing alpha-beta-unsaturated aldehydes are also obtained from the Aldox modification of the well known Oxo process. In this modification, monomer aldehyde is produced in situ by the carbonylation of an olefin with synthesis gas in the presence of a combination carbonylation-aldolization catalyst, e.g. a mixture of cobalt and zinc salts. Under carbonylation reaction conditions, the monomer aldehyde undergoes dimerization and dehydration to produce a mixture of aldehydes including unsaturated dimer aldehydes. For further details regarding the Aldox process, reference may be had to U.S. 2,811,567.

In any event, the crude reaction product obtained in either of the above processes may contain from about 5 to virtually 100% by weight of a $C_4$ to $C_{40}$ alpha-beta-unsaturated dimer aliphatic aldehyde and from 0.05 to 5 wt. percent, calculated as metal, of a cobalt salt of a $C_6$ to $C_{22}$ carboxylic acid, e.g. a fatty acid and/or naphthenic acid soap. Generally, this crude reaction product is subjected to one or more demetaling steps in which the catalyst metal residues are removed from the liquid products. This may be accomplished by hydrolysis in the presence of steam, hot water, or aqueous acidic solutions, filtration of insoluble residues, and the like. The demetaled product is then hydrogenated over a suitable hydrogenation catalyst to the corresponding dimer alcohols.

While the hydrogenation step of the above described process can be accomplished over any of a variety of known catalysts, the sulfided catalysts, e.g. molybdenum sulfide, nickel sulfide, tungsten sulfide, sulfided cobalt molybdate or mixtures of these offer several advantages. They are generally less costly than other active catalysts. Furthermore, they are not readily poisoned by either carbon monoxide or sulfur-containing feed stocks. This is especially important in the hydrogenation of alpha-beta-unsaturated aldehyde products derived from the Aldox reaction, since the olefins utilized therein frequently contain sulfur and the products therefrom are also likely to contain residual carbon monoxide.

It has been found, however, that sulfided catalysts such as molybdenum sulfide on char, while possessing many advantages as noted above, are not entirely satisfactory in the production of alcohols from feed stocks containing alpha-beta-unsaturated aldehydes. It appears that in the presence of such catalysts, the unsaturated aldehyde components of such feed stocks are incompletely hydrogenated to the corresponding alcohols and, to a significant extent, are broken down to produce hydrocarbon and monomer alcohol fragments. In any event, an alcohol product of inferior quality is obtained which is of only limited value in the production of esters for plasticizer purposes.

It has now been found that these and other disadvantages are surprisingly overcome if the crude aldolization-dehydration mixture comprising the alpha-beta-unsaturated dimer aldehyde and containing a cobalt soap dissolved therein is treated with hydrogen under moderately high pressures and at relatively high temperatures. By subjecting the crude dimer aldehyde product to hydrogen pressures above about 500 p.s.i.g. and temperatures above about 300° F., for example, the cobalt soap is reduced to cobalt metal and the olefinic double bond of the alpha, beta-unsaturated dimer aldehyde is hydrogenated. The resultant saturated aldehyde product can then be filtered to remove the cobalt metal, and the filtered liquid material readily hydrogenated over a sulfided catalyst to provide dimer alcohols of low carbonyl number and without the former experienced losses to monomer products.

As indicated hereinbefore, the crude dimer aldehyde feeds which can be advantageously treated in accordance with the present process are those generally comprising at least 5 wt. percent of a $C_6$ to $C_{40}$ alpha,beta-unsaturated aldehyde and containing from 0.05 to 5 wt. percent of a cobalt soap, e.g. a cobalt salt of a $C_6$ to $C_{22}$ carboxylic acid, especially fatty acids or naphthenic acids, dissolved therein. Preferred feeds for the present process are those comprising $C_4$ to $C_{20}$ alpha,beta-unsaturated aldehydes and from 0.05 to 0.5 wt. percent of said cobalt soaps calculated as metal on aldehydic feed.

In accordance with the process of the present invention, the unsaturated aldehydic feed is subjected to moderately high hydrogen pressures at relatively high temperatures. Generally, hydrogen pressures above 500 p.s.i.g. are found to be necessary. No particular advantage results from the use of pressures higher than about 3000 to 3500 p.s.i.g., and it has been found that excessively high pressures are to be avoided so as to minimize the production of hydrocarbon by-products. A preferred range of hydrogen pressures is between 2500 and 3000 p.s.i.g. since within this pressure range the reduction of the cobalt salt to cobalt metal is rapid and the saturation of the double bond of the unsaturated aldehyde is more selective.

Temperatures of from 300 to 475° F. are generally satisfactory, although somewhat higher temperatures than the minimum specified are desirable since at 300° F., the rate of reduction is not so rapid as may be desired. Preferably, the temperature is maintained in the range of 400 to 450° F. The crude, unsaturated, aldehydic feed is generally maintained at the specified pressure and temperature for a time sufficient to reduce the cobalt soap to cobalt metal and to simultaneously saturate the olefinic double bond of the aldehyde with hydrogen. It has been found that the desired conversion is generally completed within a time of from about 2 to about 6 hours, the exact time, of course, being somewhat dependent on the particular crude product being treated as well as on the temperature and hydrogen pressures being utilized.

The following examples will serve to further illustrate the process of the invention.

EXAMPLE I

Two aldehydic feeds differing only in the unsaturated aldehyde content were hydrogenated under similar conditions. The compositions of the feeds, the hydrogenation conditions, and the analysis of products are given in the following table.

*Table I*

|  | Feed I | Feed II |
|---|---|---|
| Feed, wt. percent: |  |  |
| Isobutyraldehyde | 36 | 36 |
| n-Butyraldehyde | 10 | 10 |
| 2-ethyl hexaldehyde | 54 |  |
| 2-ethyl hexenal |  | 54 |
| Hydrogenation Conditions: |  |  |
| Catalyst | (¹) | (¹) |
| Hydrogen, s.c.f./b | 2,300 | 2,620 |
| Water, vol. percent on feed | 17 | 16 |
| Temperature, ° F | 474 | 481 |
| Total Product, Carbonyl No | 0.84 | 0.51 |
| Product distribution, wt. percent: |  |  |
| $C_4$ Alcohol plus Hydrocarbon Cut | 53.8 | 88.8 |
| 2-ethyl hexanol | 46.2 | 10.1 |
| Bottoms | 0.0 | 0.0 |
| Wt. percent Selectivity of $C_8$ Aldehyde to $C_8$ alcohol | 85.5 | 18.7 |

¹ 10% Mo $S_2$ on char.

It will be observed that hydrogenation of the feed containing the unsaturated aldehyde, Feed II, gave poor selectivity to the corresponding $C_8$ alcohol, a high portion of the unsaturated aldehyde being converted to hydrocarbon and $C_4$ products.

EXAMPLE II n-Butyraldehyde was aldolized and the Aldol dehydrated by refluxing the monomer aldehyde in the presence of 0.2 wt. percent cobalt added as the decanoate soap. Water of dehydration was removed from the reaction mixture as it formed. The alpha,beta-unsaturated dimer aldehyde product obtained in this manner comprised 74 wt. percent 2-ethyl hexenal.

The crude dimer aldehyde product, still containing the cobalt decanoate dissolved therein, was heated for 6 hours at 450° F. under a hydrogen pressure of 2500 p.s.i.g. The dimer product after treatment in this way contained less than 1.0 wt. percent unsaturated aldehydes.

This example illustrates the effectiveness of the present process in reducing the unsaturated aldehydic content of a crude aldolization reaction mixture.

EXAMPLE III

Propylene was reacted with synthesis gas to produce butyraldehyde, which concurrently was aldolized in the presence of a combination cobalt-zinc Aldox catalyst. The conditions employed were 250° F., 3000 p.s.i.g. synthesis gas (1.35/1 mole ratio of hydrogen to carbon monoxide), 0.4 wt. percent cobalt carbonyl, and 0.2 wt. percent zinc decanoate, both calculated as metal based on propylene feed. The crude Aldox product containing 50 wt. percent alpha, beta-unsaturated dimer aldehyde, and containing also the combination cobalt and zinc soap catalysts dissolved therein, was divided into two parts. The first part was treated with an inert atmosphere (nitrogen) at 1000 p.s.i.g. and 350° F. for 6 hours. The second part was treated under the same conditions except that hydrogen was used in place of nitrogen. Analysis of the products gave the following results.

*Table II*

|  | Nitrogen | Hydrogen |
|---|---|---|
| Unsaturated $C_8$ Aldehyde, percent | 50 | 0 |
| Total $C_8$ Product ¹, percent | 64 | 68 |

¹ $C_8$ alcohol precursors plus $C_8$ alcohol.

This example illustrates the effectiveness of the present hydrogen treatment as applied to a crude alpha,beta-unsaturated aldehydic product produced by the Aldox process. Not only is the unsaturated aldehyde content of the product reduced to zero by the hydrogen treatment, but an increase in $C_8$ alcohol potential is also thereby realized.

While the present invention has been illustrated by reference to specific embodiments, it will be apparent to those skilled in the art that many modifications thereof are possible. The scope of the invention is therefore not to be limited to the specific illustrations, but is to be determined by the appended claims.

What is claimed is:

1. A process for producing a dimer alcohol from a feed containing at least 5 wt. percent of a $C_4$ to $C_{40}$ alpha,beta unsaturated dimer aldehyde and from 0.05 to 5 wt. percent of a cobalt soap of a $C_6$ to $C_{22}$ carboxylic acid which comprises contacting said feed with hydrogen at a hydrogen pressure above 500 p.s.i.g., but not exceeding 3500 p.s.i.g., and at a temperature between 300° and 475° F. whereby said cobalt soap is reduced to cobalt metal and the olefinic bond in said alpha-beta-unsaturated dimer aldehyde is saturated with hydrogen, removing said cobalt metal and thereafter hydrogenating the resultant saturated dimer aldehyde product to the corresponding dimer alcohol in the presence of a hydrogenation catalyst.

2. A process according to claim 1 in which said alpha, beta-unsaturated dimer aldehyde contains from 6 to 20 carbon atoms.

3. A process according to claim 1 in which said cobalt salt is selected from the group consisting of fatty acids and naphthenic acid salts.

4. A process according to claim 1 in which said crude product mixture contains more than 5 wt. percent of said alpha,beta-unsaturated dimer aldehyde.

5. A process according to claim 1 in which said hydrogen pressure is between 2500 and 3000 p.s.i.g. and said temperature is between 400° and 450° F.

6. A process according to claim 1 in which said hydrogenation catalyst is a sulfided hydrogenation catalyst.

7. A process according to claim 6, in which said sulfided hydrogenation catalyst is molybdenum sulfide on char.

8. In a process for producing 2-ethyl hexanol wherein butyraldehyde is dimerized to provide a crude $C_8$ aldehyde comprising product containing at least 5 wt. percent 2-ethyl hexenal and from 0.05 to 5 wt. percent cobalt in the form of a cobalt salt of a $C_6$ to $C_{22}$ acid selected from the group consisting of fatty acids and naphthenic acids dissolved therein and said crude $C_8$ aldehyde product at least in part is hydrogenated over a catalyst consisting of molybdenum sulfide on char to provide 2-ethyl hexanol, the improvement which comprises treating said crude $C_8$ aldehyde product with hydrogen at a hydrogen pressure in the range of 2500 to 3000 p.s.i.g. and at a temperature between 400° and 450° F., whereby said cobalt salt is reduced to cobalt metal and the olefinic bond in said 2-ethyl hexenal is saturated with hydrogen, and removing said cobalt metal prior to said hydrogenation to 2-ethyl hexanol over said molybdenum sulfide catalyst.

References Cited by the Examiner

UNITED STATES PATENTS

| | | | |
|---|---|---|---|
| 2,771,493 | 11/1956 | Jacks et al. | 260—638 |
| 2,813,911 | 11/1957 | Mason et al. | 260—638 |
| 2,840,619 | 6/1958 | Mason et al. | 260—638 |
| 3,118,954 | 1/1964 | Robbins et al. | 260—601 |

OTHER REFERENCES

Adkins et al.: Jour. Amer. Chem. Soc., vol. 71 (1949), pages 3051–3055.

Groggins: Unit Processes in Organic Synthesis, 4th ed. (1952), pages 572, 573, 583.

LEON ZITVER, *Primary Examiner.*

CHARLES B. PARKER, *Examiner.*

J. J. SETELIK, B. HELFIN, *Assistant Examiners.*